US005902111A

United States Patent [19]

Lindsey

[11] Patent Number: 5,902,111

[45] Date of Patent: May 11, 1999

[54] PARTY PRINTING KIT

[76] Inventor: Eleanor Lindsey, 418 E. 49th St., North Little Rock, Ark. 72117

[21] Appl. No.: 08/950,160

[22] Filed: Oct. 15, 1997

[51] Int. Cl.$^6$ ..................................................... G09B 11/00

[52] U.S. Cl. ................................................ 434/81; 434/99

[58] Field of Search ........................... 2/246; 427/1, 288; 434/81, 84, 99; 446/28

[56] References Cited

U.S. PATENT DOCUMENTS

| | | | |
|---|---|---|---|
| 4,354,282 | 10/1982 | Langdon | 2/115 |
| 4,493,650 | 1/1985 | Kaufmann et al. | 281/15.1 X |
| 4,627,110 | 12/1986 | Tengs | 2/69 |
| 4,828,497 | 5/1989 | Kurgan | 434/96 |
| 4,947,722 | 8/1990 | Lewis | 84/95.2 |
| 4,949,415 | 8/1990 | Selga | 5/502 |
| 5,057,349 | 10/1991 | Perry | 434/84 X |
| 5,279,859 | 1/1994 | May | 434/84 X |
| 5,372,506 | 12/1994 | Hambright | 434/84 |
| 5,676,549 | 10/1997 | Arad et al. | 434/84 |

FOREIGN PATENT DOCUMENTS

| | | | |
|---|---|---|---|
| 2176442 | 12/1986 | United Kingdom | 434/84 |

OTHER PUBLICATIONS

Advertisement, "Jack and Jill Tee–Shirt," Tulip, Natick, MA 1994.

*Primary Examiner*—John A. Ricci
*Attorney, Agent, or Firm*—Ray F. Cox, Jr.

[57] ABSTRACT

The present invention comprises a kit for use at childrens' parties or other special occasions; for example, birthday parties. The kit includes a T-shirt or similar article of clothing with pre-printed indicia, indicating the nature of the occasion or displaying a company's logo or other identifying phrases. The pre-printed indicia may also include directions for using the kit as described following. The kit includes a variety of fabric paints, a backing material to prevent the paints from bleeding through the fabric, brushes, markers and the like suitable for use on fabrics, and instructions. The purpose of the kit is to allow the participants at the special occasion to decorate the shirt with their handprints as a keepsake of the occasion.

3 Claims, 3 Drawing Sheets

PARTY PRINTING KIT

BACKGROUND OF THE INVENTION

The present invention relates to a kit of materials allowing the participants at a party or other event to decorate an article of apparel as a keepsake to memorialize the event. The article of apparel is provided with indicia of the nature of the event and indicia encouraging the participants to decorate the article of clothing by, e.g., placing a handprint or the like on the article of apparel with fabric paint provided in the kit.

Parties and other special and memorable events, such as birthdays, anniversaries, retirement parties, baby showers, wedding showers, going away parties, and the like are events that have special significance to the participants. It is a natural human desire to memorialize such events so as to have tangible keepsakes and reminders of these times. Among the common ways in which such events are memorialized are photographs, gift items, guest books, and invitation cards. Informal souvenirs often include decorated napkins, programs and the like.

U.S. Pat. No. 4,949,415 issued to Selga discloses the concept of a memory quilt on to which is sewn fabric patches which substitute for greeting cards. The fabric patches may have preprinted messages thereon or may be further embellished by the sender with handwritten materials in indelible ink or fabric paint.

U.S. Pat. No. 4,947,722 issued to Lewis discloses a similar concept allowing an item of decoration to be retained as a remembrance of a party or special occasion. Lewis discloses a simulated cake which includes a decorated layer that may be removed and saved.

It is known that kits of graphic materials have been provided which may be decorated. For example, U.S. Pat. No. 4,828,497 issued to Kurgan is an example of a patent on a kit of a graphic art skill development puzzle.

It is also known that garments are provided with preprinted indicia which may be subsequently altered or decorated by the wearer or others. U.S. Pat. No. 4,354,282 issued to Langdon discloses a garment preprinted with indicia related to a sports game. The garment includes markers to be used to indicate the scores of sports games. The markers are removable patches and are not permanently added to the garment.

U.S. Pat. No. 4,627,110 issued to Tengs discloses a garment with preprinted indicia and further includes a writing surface which allows a message to written thereon and later erased.

Fabric paints are widely available today in various colors for decorating articles of apparel U.S. Pat. No. 5,372,506 issued to Hambright indicates the use of fabric paints to paint a design onto a clothing item.

SUMMARY OF THE INVENTION

The present invention comprises a kit for use at childrens' parties or the like; for example, birthday parties. The kit includes a T-shirt, sweat shirt or similar article of clothing with pre-printed indicia, including indicia indicating the nature of the occasion; e.g., displaying a company's logo or other identifying phrases. The pre-printed indicia may also include directions for using the kit as described following. The kit also includes a variety of fabric paints, a backing material to prevent the paints from bleeding through, brushes, markers and similar materials and instructions. The purpose of the kit is to allow the participants at the event to decorate the shirt with handprints and add their names to identify the handprints as a keepsake of the occasion. While decorating the article of apparel with handprints is one way of decorating the article, other forms of decoration are considered to be within the scope of the present invention. The phrase "handprints" as used herein is intended to include prints of feet or other anatomical features or prints of other animate or inanimate objects made by the participants that would serve to identify and memorialize the special occasion and the participants therein.

The participants may also add their names or other messages to the article of apparel using fabric paints or other markers suitable for the permanent decoration of cloth. The kit may, e.g., include a brush for adding names, decorations, or the like to the article of apparel.

It is also desirable to include in the kit a backer board sized to fit in the article of apparel in order to provide a rigid surface to aid in the decoration of the article of apparel and further to prevent the fabric paints from bleeding through from the top layer of fabric to the bottom layer of fabric. The backer board is desirably constructed of cardboard or the like with a wax surface or similar surface that would not adhere to wet painted fabric.

It is therefore an object of the present invention to provide for a kit of materials for participants at a special occasion to use to create a decorated article of apparel as a keepsake of the occasion.

It is a further object of the present invention to provide for a kit which allows the participants at a special occasion to decorate a shirt with their handprints.

These and other objects and advantages of the present invention will be apparent from a consideration of the following detailed description of the preferred embodiments in conjunction with the drawings which are briefly described as follows:

DETAILED DESCRIPTION OF THE PREFERRED EMBODIMENTS

Figure 1:
FIG. 1 is a front view of a person wearing a keepsake T-shirt produced from the kit of the present invention.

The preferred embodiment of the present invention may be described with reference to FIGS. 1–3. The present invention comprises a kit for use at childrens' parties or the like; for example, birthday parties The kit allows the participants in a special occasion to produce a keepsake article of apparel 11 such as illustrated in FIG. 1 wherein a person 20 is shown wearing such a keepsake article of apparel 11. The keepsake article of apparel 11, in this example a T-shirt, is decorated with the handprints 30 of the participants in the special occasion. It should be noted that the present invention is not limited to birthday parties or to childrens' parties, but may be used for the commemoration of any type of special or memorable occasion; e.g., anniversaries, coming out parties, going away parties, baby showers, wedding showers, and the like.

Furthermore, the keepsake article of apparel 11 is not limited to T-shirts but may include sweatshirts or any other article of clothing Also as will be described more fully below, the keepsake article of apparel 11 may be imprinted with handprints, footprints or prints of other anatomical features Likewise, prints made by the participants may include autographs, hand-made decorative motifs or other prints that identify the participants or otherwise relate to the special occasion.

Likewise in regard to FIG. 1 it should be noted that the keepsake article of apparel 11 is provided with preprinted indicia of the nature of the special occasion and further may be provided with indicia encouraging the participants to add their own handprint or other print to the keepsake article of apparel 11. In the embodiment of FIG. 1, the special occasion is a birthday party. The keepsake article of apparel 11 is preprinted with identifying indicia 40 which proclaim, "It's my birthday." Further indicia encouraging the participants to add their handprints to the article of apparel 10 in FIG. 2 is provided with the preprinted encouraging indicia 50, "Give me a hand." Such indicia incorporating meaningful and humorous slogans serve as "ice breakers" and tie the theme of the special occasion to the keepsake article of apparel 11. Finally, the keepsake article of apparel 11 may be preprinted with logos 60 which serve to identify a sponsor such as an employer, an association or other organization.

Figure 2:
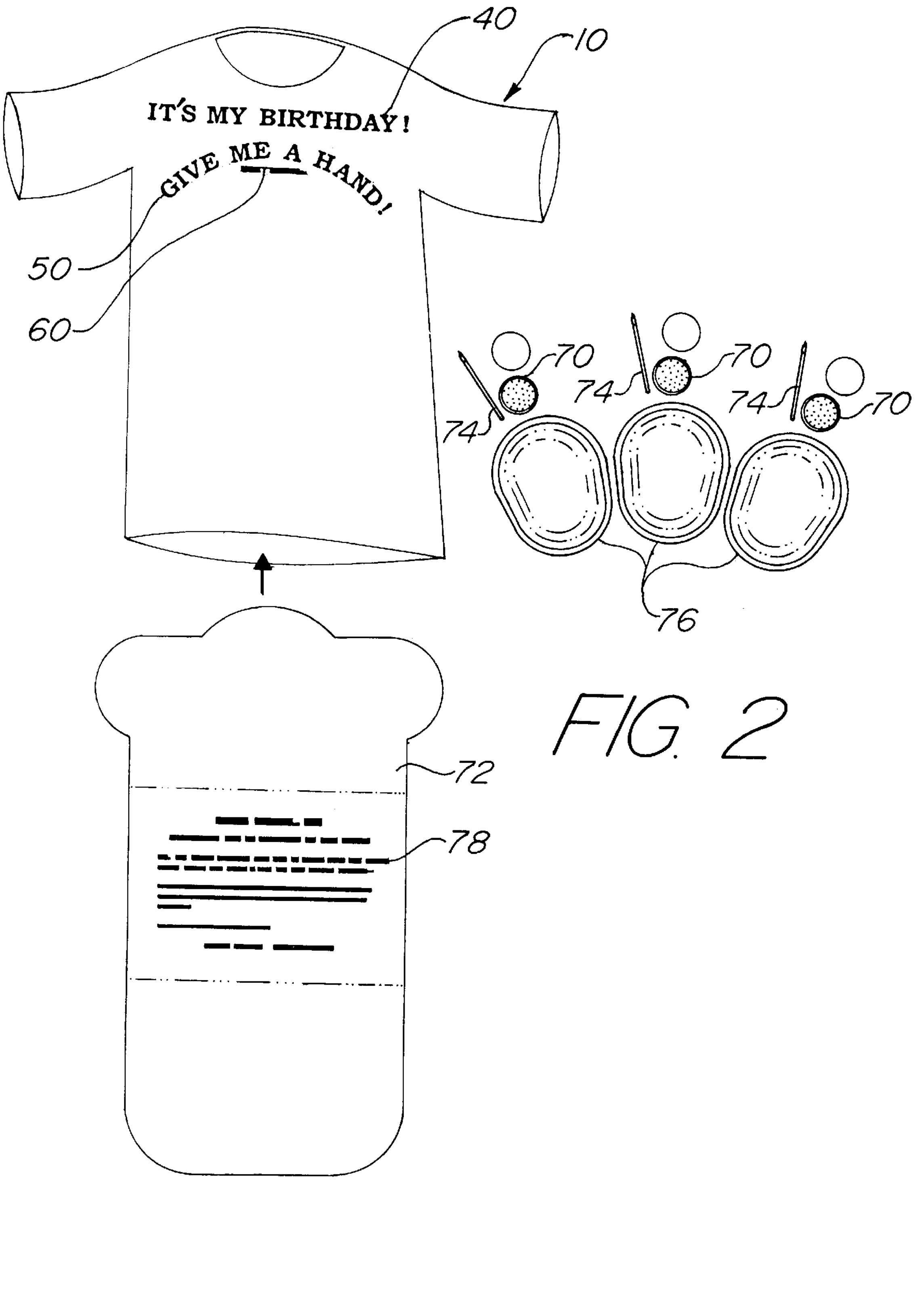
FIG. 2 is a view showing the component parts of an embodiment of the kit of the present invention.

With reference to FIG. 2, the present invention is a kit for use at a special or memorable occasion in order to produce a keepsake article of apparel 11. The kit includes a T-shirt, sweat shirt or similar article of apparel 10 with pre-printed indicia, including indicia 40 indicating the nature of the occasion, indicia 50 encouraging the participants to decorate the article of apparel 10 or a sponsoring organization's logo 60 or other identifying phrases. The kit also includes a variety of fabric paints 70, a backer 72 to prevent the fabric paints 70 from bleeding through the fabric of the article of apparel 10, brushes 74 or markers or the like, trays 76 and instructions 78.

Fabric paints are commercially available in a variety of packages. For example, screw-lid jars, squeezable tubes, and applicator containers such as described in U.S. Pat. No. 5,372,506. The applicator containers are particularly useful in the practice of the present invention and may allow the trays 76 to be dispensed with since the fabric paint may be applied directly to the object, such as hands, supplying the print.

While the embodiment of FIG. 2 shows the instructions 78 imprinted on the backer 72, such is not the only way in which the instructions 78 can be presented as envisioned by the present invention. For example, the instructions 78 may be printed separately as a pamphlet or the like. The instructions 78 may even be imprinted on the article of apparel 10.

The purpose of the kit is to allow the participants at a memorable event to decorate the article of apparel 10 with handprints and perhaps add their names to identify the handprints to produce a decorated keepsake article of apparel 11 as a reminder of the occasion. While decorating the article of apparel 10 with handprints is one way of decorating the article, other forms of decoration are considered to be within the scope of the present invention. The phrase "handprints" as used herein is intended to include prints of feet or other anatomical features or prints of other animate or inanimate objects that would serve to identify and memorialize the special occasion and the participants therein.

The participants may also add their names or other messages to the article of apparel 10 using the fabric paints 70 or other markers suitable for the permanent decoration of cloth. The kit may, e.g., include a brush for adding names, decorations, or the like to the article of apparel 10.

It is also desirable to include in the kit a backer 72 sized to fit in the article of apparel 10 in order to provide a rigid surface to aid in the decoration of the article of apparel 10 and further to prevent the fabric paints 70 from bleeding through from the top layer of fabric to the bottom layer of fabric. The backer 72 is desirably constructed of cardboard or the like with a wax surface or similar surface that would not adhere to wet painted fabric.

Finally, it is also desirable when the kit is to be used for making handprints or the like to include a plurality of trays 76 to hold quantities of the fabric paints 70.

Figure 3:
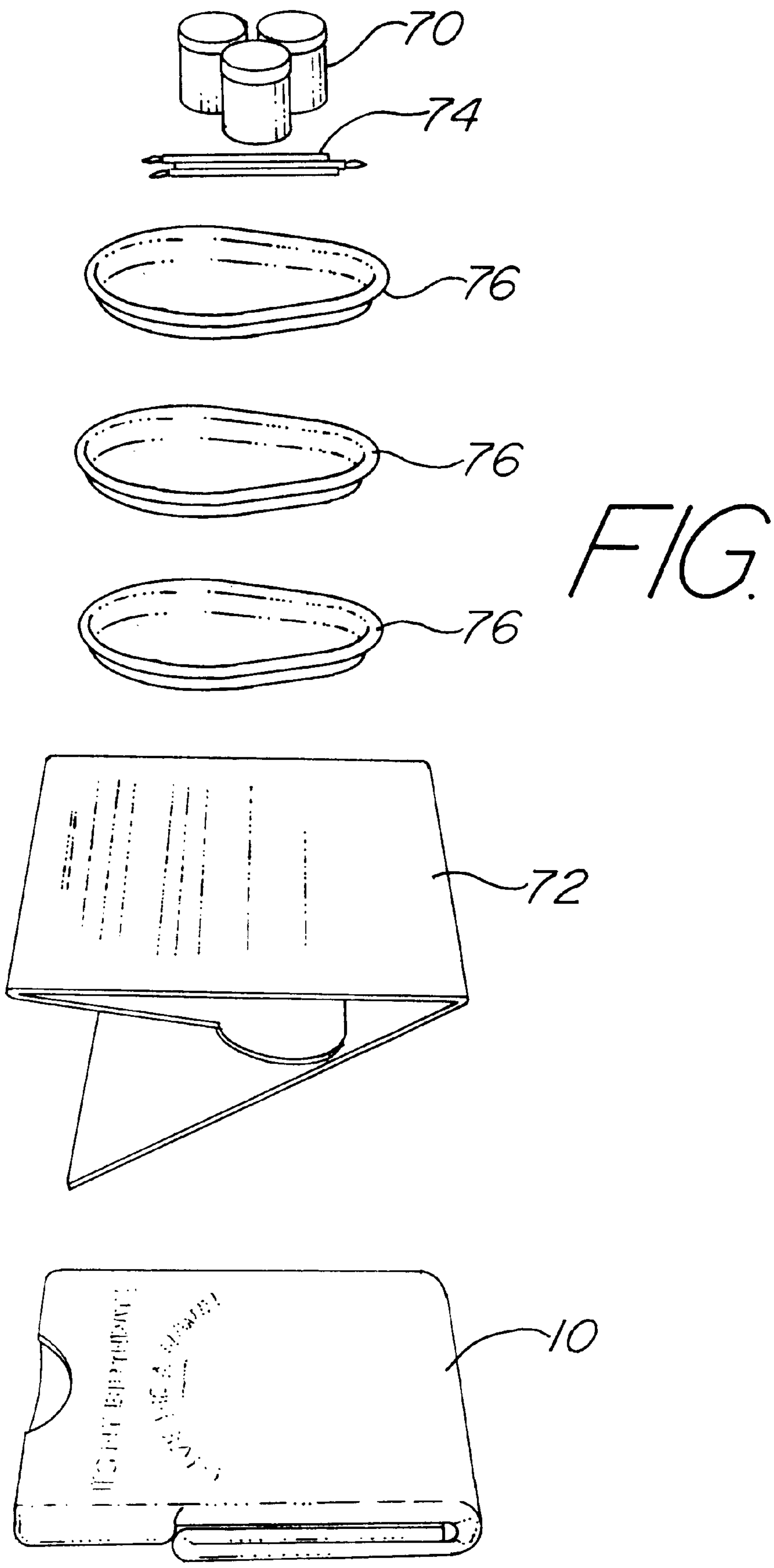
FIG. 3 is a perspective exploded view of an arrangement of the component parts of the kit of the present invention as arranged for packaging.

As is shown with respect to FIG. 3, the backer 72 may also desirably be foldable to form a support for the kit in packaged form. FIG. 3 illustrates one embodiment of the kit in an exploded form showing the article of apparel 10 folded to the same size as the folded backer 72 which may be nested together in a package with a selection of fabric paints 70, brushes 74, and trays 76.

The present invention has been described with reference to certain preferred and alternative embodiments which are intended to be exemplary only and not limiting to the full scope of the present invention as set forth in the appended claims.

What is claimed is:

1. A kit for use by the participants in a memorable occasion for decorating an article of apparel to create a keepsake of the memorable occasion, comprising:

an article of apparel comprising a fabric material having an exterior surface and first and second portions of said exterior surface, said first portion having printed thereon indicia of the nature of the memorable occasion and indicia encouraging the participants to place handprints and signatures on the article of apparel, and said second portion being free of printed indicia allowing the placement of handprints and signature thereon;

at least one fabric paint;

a backer board for placement within said article of apparel to contain fabric paint from bleeding through said fabric material and to provide a firm supporting surface for placing the handprints and signatures on the article of apparel;

at least one fabric marking means for placing said signatures on said article of apparel; and at least one tray for holding a quantity of said fabric paint.

2. The kit of claim 1 wherein said backer board comprises a generally shirt-shaped, wax-coated cardboard sheet.

3. A method of producing a keepsake article of apparel commemorating a memorable occasion, comprising the steps of:

(a) providing an article of apparel having an exterior surface and having first and second portions of said exterior surface, said first portion having preprinted indicia of the nature of the memorable occasion and having preprinted indicia encouraging the participants in the memorable occasion to place their handprints and signatures on the article of apparel, and said second portion being free of printed indicia allowing the placement of handprints and signatures thereon;

(b) providing the participants with at least one fabric paint for placing the participants' handprints on the article of apparel and at least one fabric marking means for placing the participants' signature on the article of apparel, providing at least one tray for holding a quantity of fabric paint, and placing a quantity of fabric paint in said tray;

(c) coating at least one participant's hand with fabric paint from said tray and placing the participant's hand on the article of apparel to produce a handprint of the participant on the article of apparel; and (d) signing the participant's signature on the article of apparel in proximity to the participant's handprint.

* * * * *